S. HATASHITA AND J. G. WINSOR.
TRAILER.
APPLICATION FILED OCT. 27, 1920.

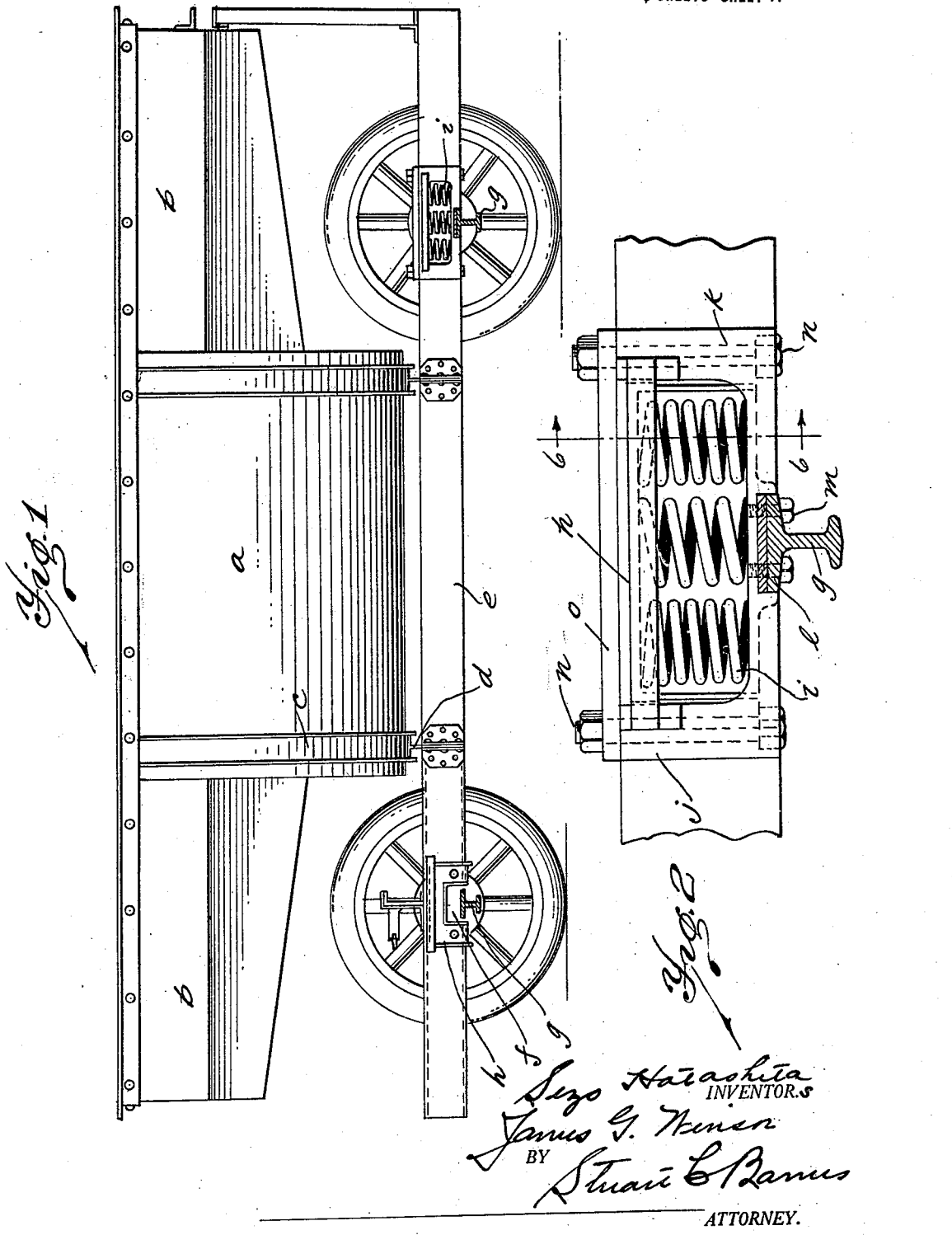

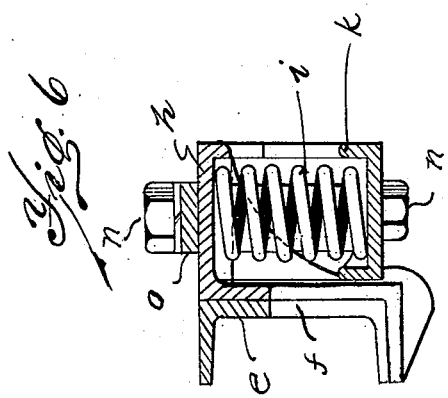
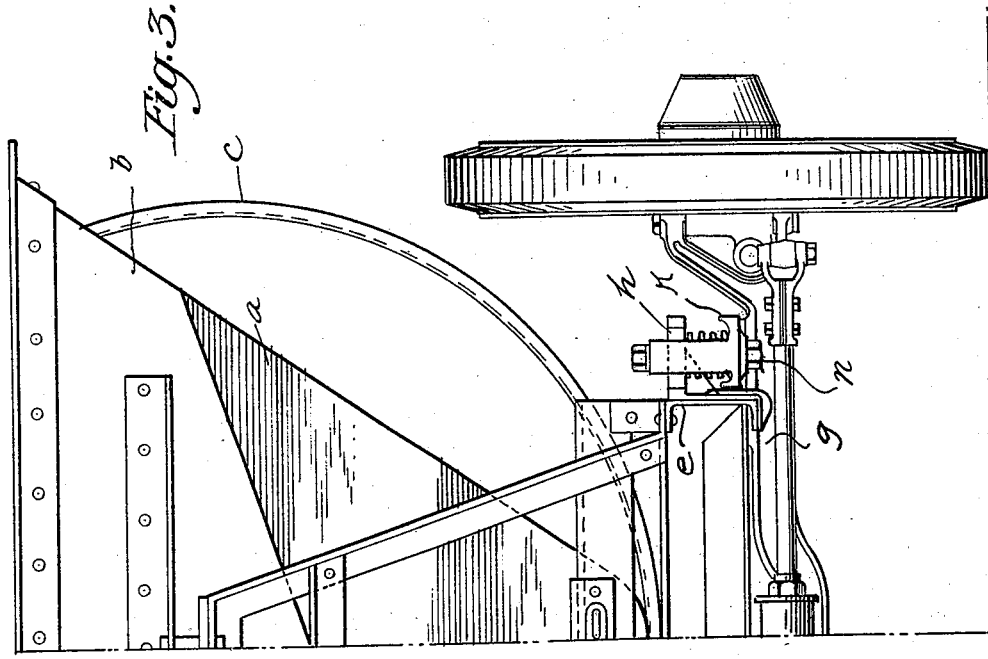

1,409,294.

Patented Mar. 14, 1922.
3 SHEETS—SHEET 3.

Sezo Hatashita
James G. Winsor
INVENTORS
BY
Stuart C. Barnes
ATTORNEY.

UNITED STATES PATENT OFFICE.

SEZO HATASHITA AND JAMES G. WINSOR, OF DETROIT, MICHIGAN.

TRAILER.

1,409,294.  Specification of Letters Patent.  Patented Mar. 14, 1922.

Application filed October 27, 1920. Serial No. 419,837.

*To all whom it may concern:*

Be it known that we, SEZO HATASHITA, a subject of the Emperor of Japan, and JAMES G. WINSOR, a citizen of the United States, residing at Detroit, in the county of Wayne and State of Michigan, have invented certain new and useful Improvements in Trailers, of which the following is a specification.

This invention relates to trailers, and has for its object a special form of spring suspension for trailers which is especially adapted to take a low frame. It is very well designed to be used in connection with a trailer chassis provided with a dump body having end extensions. These and other objects will more fully appear after the invention is understood in detail.

In the drawings,—

Fig. 1 is a longitudinal section of our new trailer equipped with a dumping body having end extensions.

Fig. 2 is a cross section through the axle showing in side elevation the spring suspension between the trailer frame and the axle.

Fig. 3 is a fragmentary end elevation of the trailer showing both the spring suspension and the side dumping body.

Fig. 6 is a section on the line 6—6 of Fig. 2.

$a$ designates a side dumping body of V cross section provided with end extensions $b$ to enable the body to have a maximum capacity and at the same time clear the wheels in dumping. The body rolls from the center to the sides of the trailer frame on the rockers $c$ which are arcs of circles. These rockers travel on tracks $d$. This much of the construction is old and is described in the prior application of James G. Winsor No. 298,705. In that application there is shown a drop frame, that is to say, a frame which is bent down between the axles so as to accommodate the main portion of a dumping body of this kind but which has raised portions at the ends in order to permit it to be suitably attached to the elliptical springs that are ordinarily used for suspension in vehicles of this character. It is the object of the present invention to provide a spring suspension which permits the use of a perfectly straight frame, for instance, the side sills or channels $e$ run straight end to end. At the axle they are recessed to provide recesses $f$ which permits the front and rear axles $g$ to ride up slightly into the recess of the sill.

Figure 4:
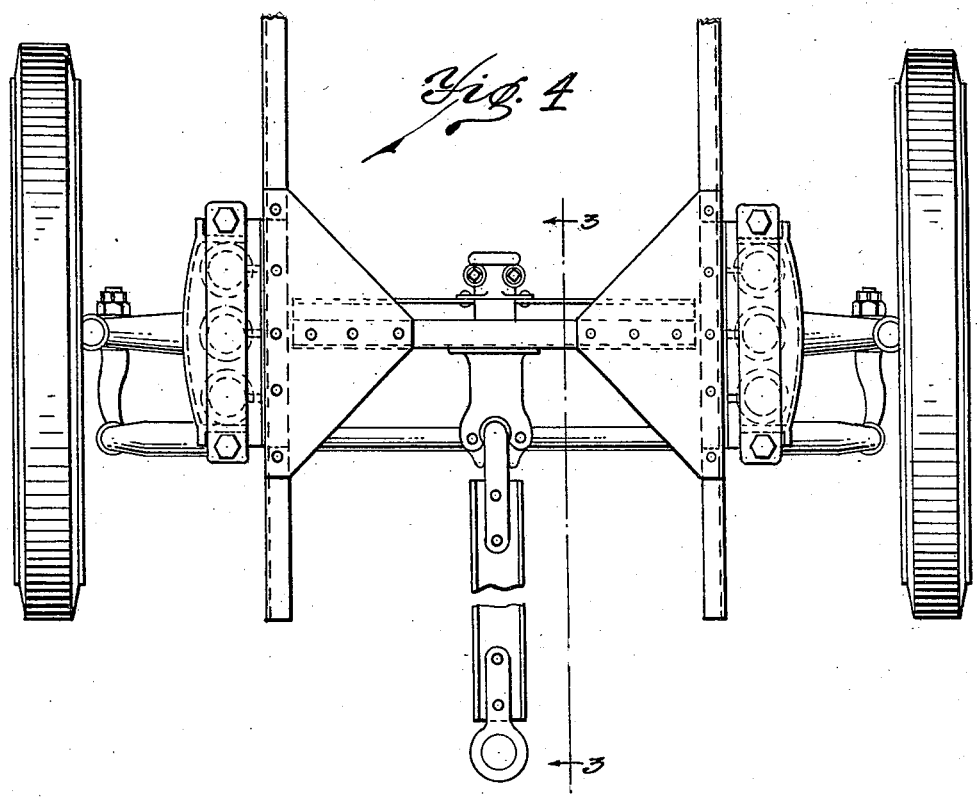
Fig. 4 is a fragmentary plan view of our invention.

Riveted to the sill at this point both as a reinforcement and to support the trailer frame upon the springs is an angle strip or saddle $h$. This engages the tops of the coil springs $i$ here shown as three in number. The ends of this saddle straddle (see Fig. 4) and are guided and held from lateral movement on the posts $j$ of the bracket $k$. This bracket is clamped to the pad $l$ of the axle $g$ by means of bolts $m$. Now obviously the saddle $h$ being riveted to the sill $e$, this sill and the trailer frame are suspended yieldingly upon the axle by means of the saddle $h$ riding upon the bracket and resisted by the coil springs $i$.

This is a much cheaper construction than ordinary elliptical springs, and as already explained, permits the use of a trailer frame which normally is almost on the axle line and which may be straight. With a body of the character shown in the drawings a low hung trailer frame must be used in order to accommodate the central portion of the body between the wheels. This, as already explained, requires raised upper ends in order to bring the chassis frame above the usual elliptical springs. By utilizing the spring suspension described, a straight frame, which is a much cheaper construction, may be utilized for this purpose.

The posts $k$ are hollow to receive the bolts $n$ which clamp the cap plate $o$ to the top of the post to keep the saddle inside of the bracket.

Figure 5:
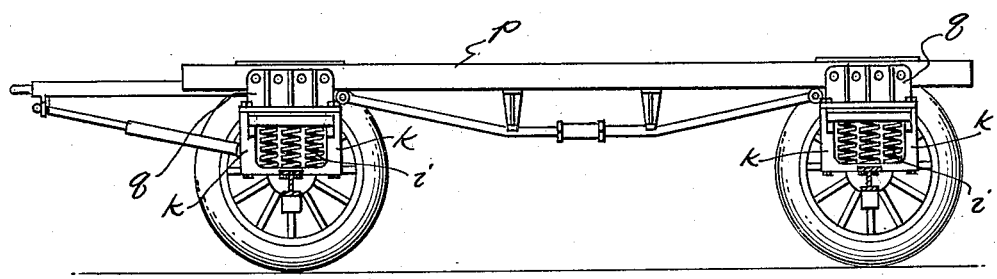
Fig. 5 is a side elevation of a trailer equipped with a modified form of our spring suspension.

In Fig. 5 we have shown a modified form of this construction in which this spring suspension is utilized to support an ordinary trailer frame upon the axle. This trailer frame is designated $p$, and in place of recessing the sills opposite the axle a saddle of a slightly different form designated $q$ is used. In this case the plate portion of the saddle that engages the spring is at the bottom instead of at the top of the vertical portion. However, the saddle is guided on the posts $k$ in precisely the same manner and the same springs $i$ are utilized to support the saddle in the bracket. This is a cheaper construction than the ordinary elliptical springs and is a very much better suspension for trailers as it does away with all necessity of radius rods.

What we claim is:

1. In a road vehicle, the combination of an axle and frame, a bracket provided with upright posts attached to the axle, a saddle secured directly to the frame and extending at its ends to the outside of said posts and guided in vertical reciprocation at its ends upon the said posts, coil springs interposed between the bottom of the saddle and the floor of the bracket, and a cap plate clamped to the tops of the posts to hold the saddle in assembly with the bracket.

2. In a road vehicle, the combination of a frame provided with side sills having notches adjacent the axle, the said axle adapted to rise into the said notches of the said sills when subjected to stress, a saddle secured to the frame, a bracket attached to the axle, and springs interposed between the saddle and the said bracket.

3. In a road vehicle, the combination of a frame provided with sills having notches adjacent the axle, the said axle adapted to rise into the said notches when subjected to stresses, and notched saddles secured to the sills so that the notches of sill and saddle register and provided with projecting spring-engaging portions, brackets secured to the said axle adjacent the notches in the sills and provided with upright posts, the said spring-engaging portions of the saddle being engaged on the posts to be guided in reciprocation therein, and coil springs spacing the said saddle plates and the bracket floors.

4. In a road vehicle, the combination of a frame provided with notches adjacent the axle, the said axle adapted to rise into said notches, saddles provided with vertical portions having notches and rigidly secured to the said sills adjacent the said notches in the sills, brackets attached to the axles adjacent the sills and provided with upright posts, the said saddles provided with projecting plates adapted to engage the outside of the said posts to be guided in vertical reciprocation in the brackets, coil springs spacing said plates and the bottoms of the brackets, and means secured to the tops of the posts to prevent the saddles from becoming disengaged from the posts.

In testimony whereof we affix our signatures.

SEZO HATASHITA.
JAMES G. WINSOR.